United States Patent
Mathon et al.

(10) Patent No.: US 9,457,435 B2
(45) Date of Patent: Oct. 4, 2016

(54) METHOD FOR PRODUCING A PROPELLER BLADE FROM A COMPOSITE MATERIAL

(71) Applicants: SNECMA, Paris (FR); SAFRAN, Paris (FR)

(72) Inventors: Richard Mathon, Brunoy (FR); Olivier Foussard, Etiolles (FR); Yann Marchal, Melun (FR); Franck Bernard Leon Varin, Voulangis (FR)

(73) Assignees: SNECMA, Paris (FR); SAFRAN, Paris (FR)

( * ) Notice: Subject to any disclaimer, the term of this patent is extended or adjusted under 35 U.S.C. 154(b) by 202 days.

(21) Appl. No.: 14/374,670

(22) PCT Filed: Jan. 24, 2013

(86) PCT No.: PCT/FR2013/050145
§ 371 (c)(1),
(2) Date: Jul. 25, 2014

(87) PCT Pub. No.: WO2013/110895
PCT Pub. Date: Aug. 1, 2013

(65) Prior Publication Data
US 2015/0013160 A1    Jan. 15, 2015

(30) Foreign Application Priority Data

Jan. 25, 2012   (FR) ...................... 12 50705
Jan. 25, 2012   (FR) ...................... 12 50707
Jan. 25, 2012   (FR) ...................... 12 50708
Jan. 25, 2012   (FR) ...................... 12 50710

(51) Int. Cl.
*B23P 15/04*   (2006.01)
*B29C 70/48*   (2006.01)
(Continued)

(52) U.S. Cl.
CPC .............. *B23P 15/04* (2013.01); *B29C 31/085* (2013.01); *B29C 70/086* (2013.01); *B29C 70/48* (2013.01);
(Continued)

(58) Field of Classification Search
CPC .................. B29L 2031/082; B29L 2031/085; B29L 2031/08; B29L 2031/087; B29C 70/46; B29C 70/48; B29C 70/685; B29C 70/687; B29C 70/541; B29C 70/542; B29C 70/56; B29C 70/086; B29C 70/20; B29C 31/08; B29C 31/085; Y10T 29/49337; Y10T 29/49336; B23P 15/04; B64C 11/26
See application file for complete search history.

(56) References Cited

U.S. PATENT DOCUMENTS 2,746,514 A * 5/1956 Warnken ............... B29C 43/361
                                                 156/581
4,095,322 A * 6/1978 Scarpati ................ B29C 70/345
                                                 156/182

(Continued)

FOREIGN PATENT DOCUMENTS

DE    10 2010 014 931 A   10/2011
EP         1 695 813 A1    8/2006
(Continued)

OTHER PUBLICATIONS

French Search Report issued Sep. 11, 2012 in Patent Application No. 1250708 (with English translation of categories of cited documents).
(Continued)

*Primary Examiner* — Jason L Vaughan
(74) *Attorney, Agent, or Firm* — Oblon, McClelland, Maier & Neustadt, L.L.P.

(57) ABSTRACT

A propeller blade, which can belong to a fan without covering by an external casing, includes two portions fitted into one another and of different materials, generally composite, to resist various stresses, heating coming from a rotor or impacts of solid bodies. An internal portion includes a blade core, a blade shank and possibly a foam lining, and a preform of an outside portion is assembled to it by surrounding it closely before being completely formed by receiving its resin, which is placed into polymerization. A method for producing the propeller blade guarantees good assembly of the portions without defects of form, damage or deformation of a fiber weave.

15 Claims, 6 Drawing Sheets

(51) Int. Cl.

| | | |
|---|---|---|
| *B29C 70/54* | (2006.01) | |
| *B29C 70/86* | (2006.01) | |
| *B29D 99/00* | (2010.01) | |
| *B29C 70/08* | (2006.01) | |
| *B64C 11/26* | (2006.01) | |
| *B64F 5/00* | (2006.01) | |
| *B29C 31/08* | (2006.01) | |
| *B29C 70/24* | (2006.01) | |
| *B29L 31/08* | (2006.01) | |
| *B64D 27/00* | (2006.01) | |

(52) U.S. Cl.
CPC ............ *B29C 70/541* (2013.01); *B29C 70/86* (2013.01); *B29D 99/0025* (2013.01); *B64C 11/26* (2013.01); *B64F 5/0009* (2013.01); *B29C 31/08* (2013.01); *B29C 70/24* (2013.01); *B29L 2031/08* (2013.01); *B64D 2027/005* (2013.01); *Y02T 50/66* (2013.01); *Y10T 29/49332* (2015.01); *Y10T 29/49336* (2015.01); *Y10T 29/49337* (2015.01)

(56) References Cited

U.S. PATENT DOCUMENTS

| | | | | |
|---|---|---|---|---|
| 4,648,921 A * | 3/1987 | Nutter, Jr. | ............... | B29C 70/08 156/242 |
| 4,898,515 A * | 2/1990 | Beno | .................... | B29C 70/083 416/134 A |
| 4,971,641 A * | 11/1990 | Nelson | .................... | B64C 11/26 156/245 |
| 5,222,297 A | 6/1993 | Graff et al. | | |
| 5,836,062 A * | 11/1998 | Leahy | ................ | B29D 99/0028 29/23.51 |
| 6,261,395 B1 | 7/2001 | Duffy | | |
| 6,843,565 B2 * | 1/2005 | Evans | .................... | B29C 70/34 353/28 |
| 7,581,932 B2 * | 9/2009 | Coupe | .................... | B29B 11/16 264/257 |
| 9,162,750 B2 * | 10/2015 | Coupe | .................... | B64C 11/26 |
| 9,193,101 B2 * | 11/2015 | Gummel | ................. | B29C 33/22 |
| 2006/0017200 A1 | 1/2006 | Cundiff et al. | | |
| 2006/0188378 A1 | 8/2006 | Bech et al. | | |
| 2007/0092379 A1 | 4/2007 | Coupe et al. | | |
| 2010/0074979 A1 | 3/2010 | Cundiff et al. | | |
| 2010/0254821 A1 | 10/2010 | Parkin et al. | | |
| 2011/0085911 A1 | 4/2011 | Schroder et al. | | |
| 2011/0259515 A1 | 10/2011 | Rotter | | |
| 2011/0291325 A1 | 12/2011 | Mattia | | |
| 2011/0318513 A1 | 12/2011 | Marsal et al. | | |
| 2013/0272893 A1 | 10/2013 | Fabre et al. | | |

FOREIGN PATENT DOCUMENTS

| | | |
|---|---|---|
| EP | 1 777 063 | 4/2007 |
| EP | 2 241 432 A2 | 10/2010 |
| EP | 2 308 670 | 4/2011 |
| EP | 2 383 106 A1 | 11/2011 |
| FR | 2 683 764 | 5/1993 |
| FR | 2 683 764 A1 | 5/1993 |
| FR | 2 940 173 | 6/2010 |
| FR | 2 955 609 A1 | 7/2011 |
| WO | WO 93/08017 A1 | 4/1993 |
| WO | WO 99/59802 A1 | 11/1999 |
| WO | 2012 001279 | 1/2012 |
| WO | WO 2012/001279 A1 | 1/2012 |

OTHER PUBLICATIONS

French Search Report issued Sep. 3, 2012 in Patent Application No. 1250707 (with English translation of categories of cited documents).

French Search Report issued Nov. 9, 2012 in Patent Application No. 1250710 (with English translation of categories of cited documents).

French Search Report issued Nov. 9, 2012 in Patent Application No. 1250705 (with English translation of categories of cited documents).

International Search Report Issued May 8, 2013 in PCT/FR13/050145 Filed Jan. 24, 2013.

* cited by examiner

METHOD FOR PRODUCING A PROPELLER BLADE FROM A COMPOSITE MATERIAL

The invention relates to a method for manufacturing a propeller blade, which can be used for example for fan propellers for so-called "open rotor" engines, which are not covered by an external casing and are therefore exposed to the atmosphere, without the method being restricted to such propellers.

The blades can be favourably constructed from composite materials, in order to reduce their weight in particular, but diverse requirements concerning resistance must be complied with. In particular, they must resist both accidental impacts of solid bodies and the transmission of heat originating from the rest of the engine. The first of these constraints concerning the free surface of the blades and the second their core, one had the idea to construct the blades in several portions, made of different materials that respectively resist well these stresses of impact and of heating, and assembled together by forming a unitary structure. One of these portions is an outside portion of the blade, and the other, called a longeron, comprises a blade shank connected to the engine and a blade core inserted into the outside portion. The longeron resists the heating, and the outside portion the impacts. It is also considered to insert foam between the blade core and the outside portion in order to further lighten the blade, for example by gluing it around an outline of the blade core.

Documents WO 2012/001279A, FR 2 683 764 A and FR 2 940 173 A describe processes for manufacturing such a blade composed of a longeron clamped in a blade preform.

An essential step is the insertion of the longeron possibly lined with foam into a central opening of a preform of the outside portion, comprised of a still free fibre weave, i.e. devoid of polymerising resin, and therefore flexible in such a way as to be able to close around the longeron. Diverse difficulties appear on this occasion: the preform cannot be excessively open in order to allow the longeron to pass through because excessive deformations, leading to the displacement of the fibres of the preform, and later to a degradation of the resistance of the outside portion, can appear; the foam glued to the longeron is very fragile and can easily be damaged during the insertion as its peripheral thickness is very low, which therefore imposes a sufficient opening of the preform despite the risks mentioned; and the position of the longeron with the foam in the preform must be very precise otherwise there is a risk of a defect in the closing of the mould wherein the assembly must be placed in order to inject the resin for manufacturing the preform, and again a manufacturing defect.

A suitable method of manufacturing has been proposed. In a general form, this entails a method for manufacturing a propeller blade, comprising the following steps:

formation of a longeron comprising a blade core;
formation of a blade preform comprising a fibre weave, the weave having a separating area wherein it is divided into two superimposed skins, the separating area comprising a location intended to receive the blade core;
positioning the blade preform into an equipment comprising an indentation of said preform;
opening of the separating area by separating the skins;
installation of the longeron by inserting the blade core into the separating area,
closing of the separating area by bringing the skins closer together;
injection of resin into the blade preform;
polymerisation of the resin and machining of the blade preform; characterized in that it comprises:
a step of creating trackers which are reference marks at determined positions on the blade preform, during the formation of the blade preform;
a step of forming the blade preform at a determined position in the indentation after the positioning, by coinciding the trackers with target positions set in the equipment;
and a step of tightening the blade preform in the indentation outside the separating area before the opening of the separating area before the opening of the separating area and until the longeron is installed.

This method per se resolves the problem of manufacturing a propeller blade formed of two portions of different materials and intimately united together, one of the portions being fitted into the other and the two portions able to be of a composite material, with a good manufacture quality stemming from a precise relative position of the preform about the longeron, a lack of damage to the preform during the opening and the insertion of the longeron, if it is covered with foam. The preform indeed stays at a precise position in the equipment during all the process time, particularly when the longeron is installed inside, until resin is injected and polymerised.

The above-mentioned prior patents indeed do not propose solutions to these various problems. They propose, without giving details, to open the preform and to toss the longeron thereinto, or to manufacture the preform in a single stripe of fiber cloth, to lay the longeron on a half of this cloth and to wrap the other half on the longeron. These step do not give any security against the possible difficulties which were indicated. Generally, they are not mentioned to be made in the equipment that will be used for the polymerisation, and should this be true, the authors of these prior processes do not take any advantage of this.

The use of the polymerisation equipment is contrarily exploited in the invention for contributing not only to stabilise the blade preform position, but also for locating it and maintaining it at a determined position, with a coincidence of trackers previously made on the blade preform and target positions of these trackers, which are defined on the equipment, or at least with reference to it, by a device having a position calibrated with respect to the equipment. One can tighten the preform in the indentation without difficulty and without risking to displace it, with the help of another device, which is advantageously connected with the equipment; finally, the conventional opening step of the separating area can be accomplished delicately and without risk of displacing the preform so long the tightening is maintained, again with the help of a device connected with the equipment.

The tightening device may be directly implanted on the equipment, and the opening device may merely stand on the equipment.

The invention shall now be described using the following figures, which show the diverse steps of a method for manufacturing a propeller blade in accordance with the invention, but not restrictive of other embodiments of the latter:

FIG. 1 is a general view of the longeron;
FIG. 2 is a general view of the blade preform;
FIG. 3 is a general view of the equipment;
FIG. 4 is a view explaining the step of setting up the preform in the equipment;
FIG. 5 is a view explaining the mode for maintaining the blade preform in place;

Figure 1:
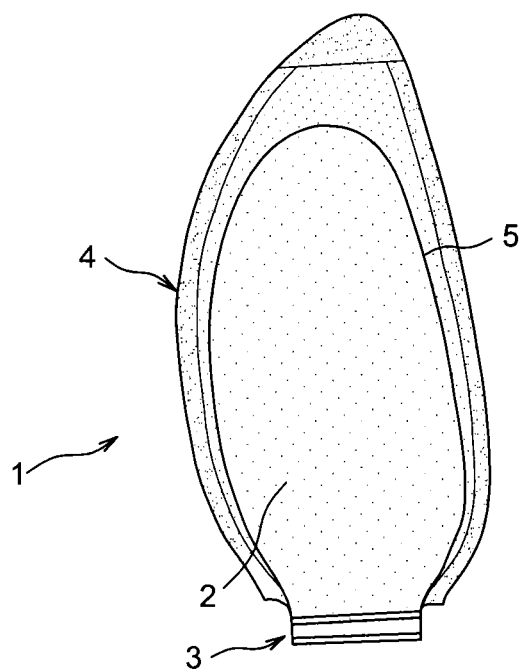
Figure 2:
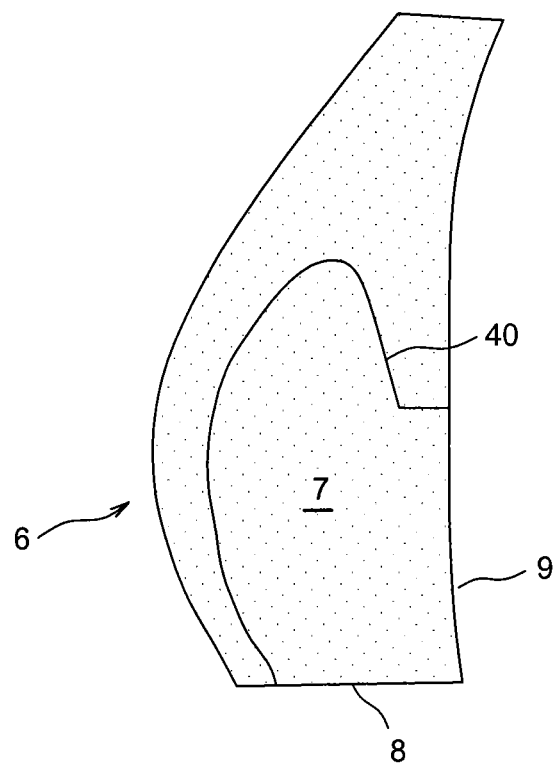

FIGS. 1 and 2 shall now be described. The blade comprises a longeron 1 able to be realised using a preform formed of a carbon fibre three-dimensional weave, which is then impregnated with resin via an injection method, polymerised then machine tooled. The longeron 1 comprises a blade core 2 and a blade shank 3. After the machine tooling of the longeron 1, a foam lining 4, obtained beforehand by machine tooling in a plate, is glued onto the edge 5 of the blade core 2. The blade further comprises an outside portion, comprising in particular the outside surfaces, which intervene in the method of the invention in the state of a blade preform 6 composed of a carbon fibre weave and machine tooled by water jet blasting in order to take the exterior outlines of the blade. This weave is flexible and free, as it has not received the polymerising resin which will complete its structure. The weaving of the blade preform 6 is unitary over the greatest portion of its surface but it does have however a separating area 7 which divides the blade preform 6 into two superimposed skins, located on the side of the lower surface and of the upper surface of the blade, in such a way as to form a housing cavity of the blade core 2 and of the foam lining 4 when the separating area 7 is open; the separating area 7 comprises a large portion of the centre of the blade core 6 as well as portions of an inside edge 8 in order to allow to extend the blade shank 3 and a vertical edge 9 in order to allow for the separation of the skins and the insertion of the longeron 1 of the foam lining 2.

Figure 3:
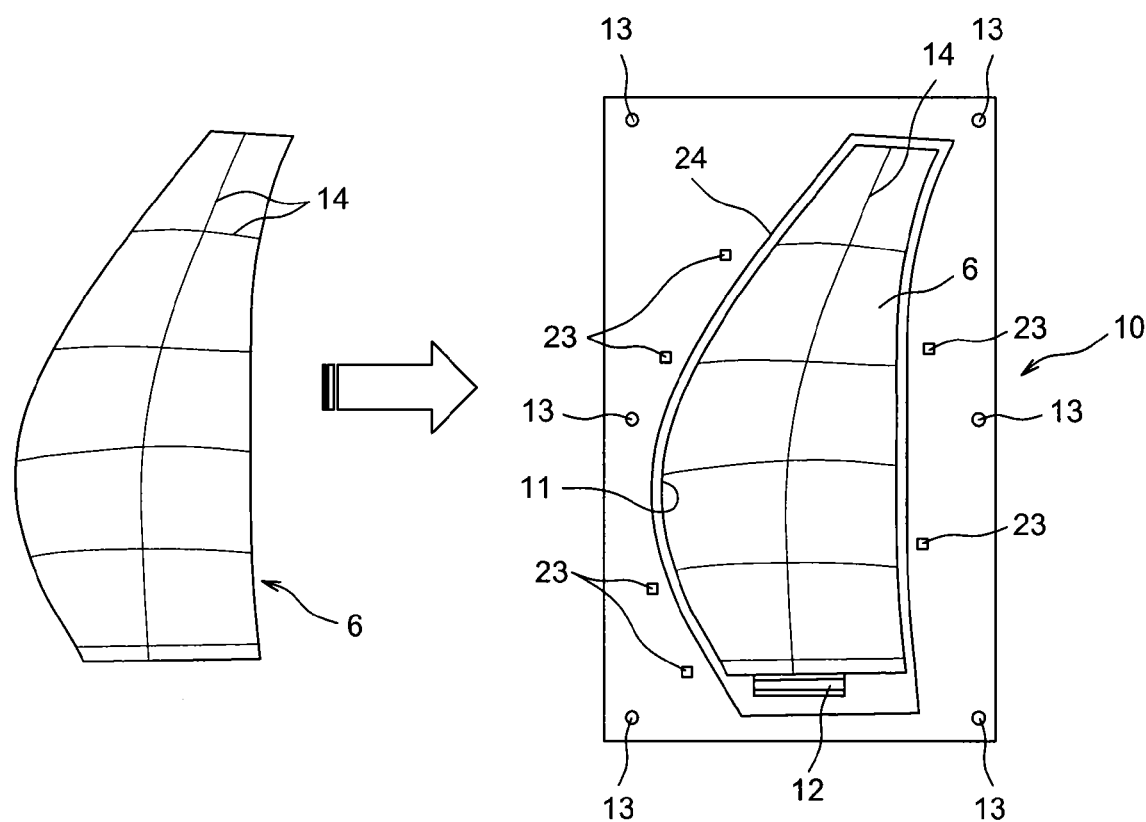

The characteristic steps of the method of the invention shall now be described. A first step of the assembly between the blade core 6 and the longeron 1 provided with the foam lining 4 is carried out by means of equipment 10 shown in FIG. 3. It consists of half of a mould which comprises an indentation 11 of a shape similar to that of the blade preform 6 and wherein the latter can therefore be installed, with an appendage 12 for receiving the blade shank 3. It further comprises, around the indentation 11, a certain number of one-off position reference patterns 13. Six patterns 13 are sufficient in all cases to provide a complete reference.

Figure 4:
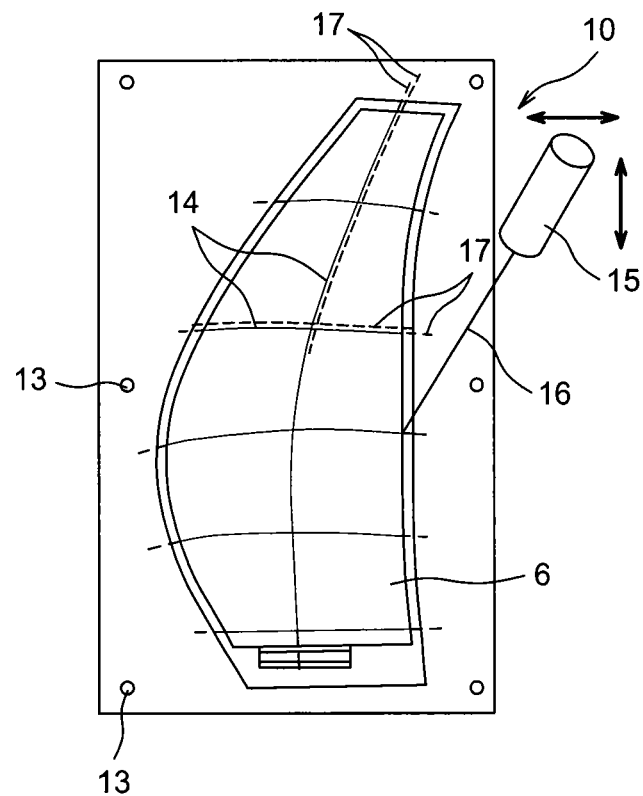

FIG. 4 shows the insertion of the blade preform 6 in the equipment 10. The blade preform 6 was soaked in demineralised water in order to stiffen it somewhat. Some of the fibres of the blade preform 6 have trackers 14, i.e. tracking fibres comprises of fibres of carbon and glass twisted together, and which extend over crossed lines at determined positions of the blade preform 6. The glass fibres are used to render the trackers 14 separate visually from the other fibres, and the carbon fibres to provide them with sufficient resistance.

A mobile laser 15 in a horizontal plane above the equipment 10 projects a beam 16 on the equipment 10 and the blade preform 6. The movements of the laser 15 are programmed so that the projection of the beam 16 follows the projection lines 17 coinciding with target positions of the trackers 14 if the blade preform 6 is correctly installed in the equipment 10. The preliminary position adjustments of the laser 15 are carried out by aiming for the patterns 13. If therefore a separation appears between the projection lines 17 and the trackers 14, the blade preform 6 is displaced manually in the indentation 11 until the coincidence is re-established: the blade preform 6 is then in a perfectly determined position, and without being deformed, in the indentation 11.

Figure 5:
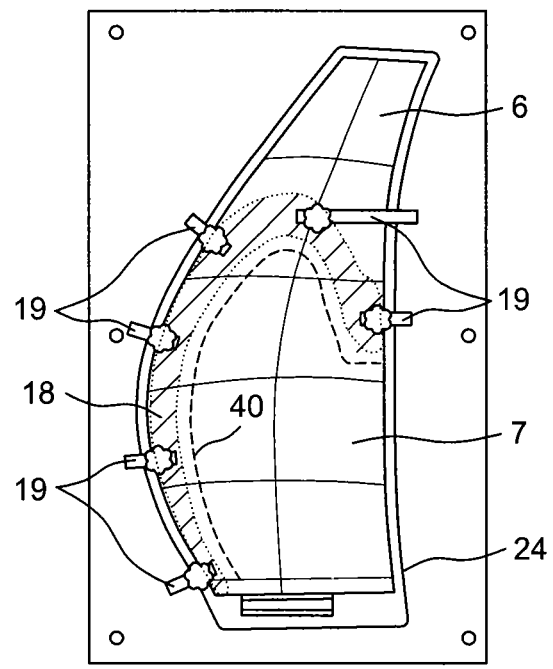
Figure 6:
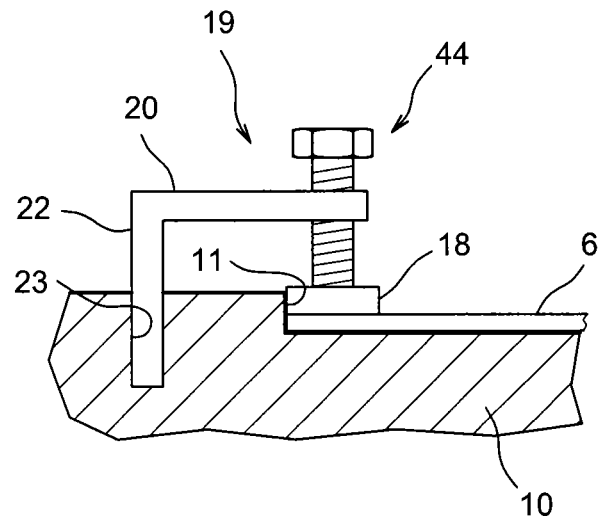
FIG. 6 shows one of the clamping jaws of the retaining shoe.

When this step has been accomplished, a clamping shoe 18, shown in FIG. 5, is placed on the blade preform 6 and clamped. It extends for a short distance from the outline 40 of the separating area 7 (by a few centimeters) and penetrates into the indentation 11. Its clamping onto the blade preform 6 is obtained via the jaws 19, comprising as is shown in FIG. 6, an arm 20 overhanging the equipment 10, a rod 22 supporting the arm 20 and implanted in a respective drilling 23 of the equipment 10, and a pressure screw 24 engaged on the arm 20 and pressing the shoe 18. If the same equipment 10 is then used for the injection of resin in order to finish forming the blade preform 6, the drillings 23 re distributed at the exterior of a seal 44 surrounding the indentation 11 in order to prevent the resin overflowing from the indentation 11 to flow there. The clamping portion 18 is made from thermoformed polymer of a few centimeters in thickness, and has a concave and irregular shape in such a way that its internal edge follows the outline 40 of the separating area 7, also at a distance of a few centimeters, and that its external edge follows the outline of the indentation 11 in an adjusted manner. The laser 15 can remain in action during the clamping of the shoe 18 in order to check that the fibre weave is not excessively deformed.

Figure 8:
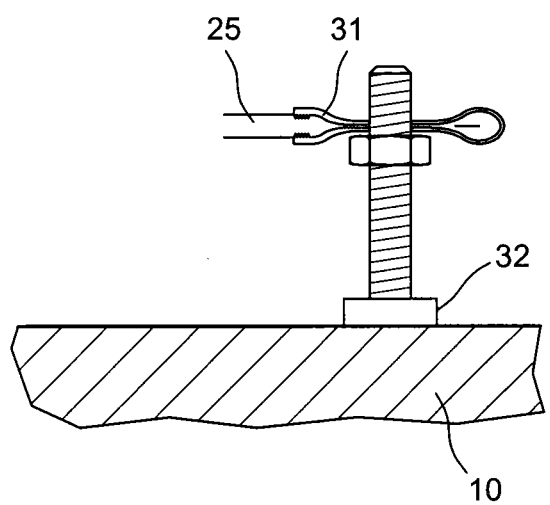
FIG. 8 shows a device for lifting the plate of the separator.
Figure 7:
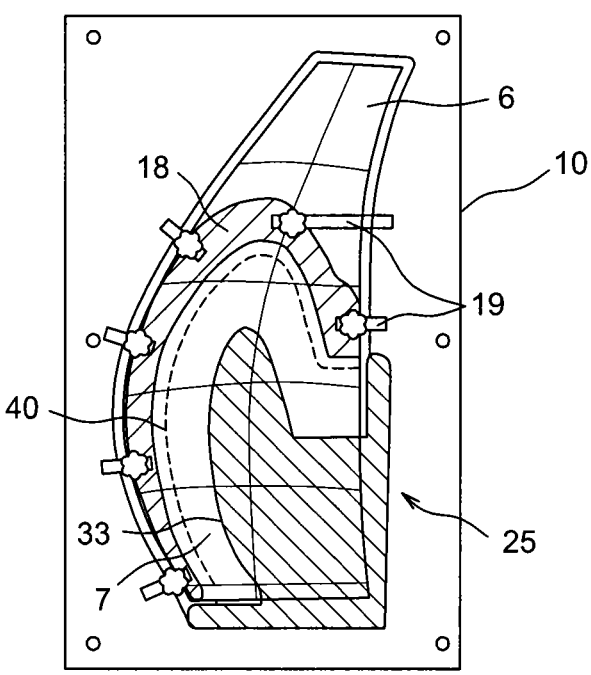
FIG. 7 shows the setting up of a separator of the separating area of the preform.

The following step in the method consists in a separating of the blade preform 6 from the separating area 7. A separator 25 is used for this, shown firstly in FIG. 7, and which comprises a plate 25 slipped between the two skins 26 and 27 of the blade preform 6. The separator further comprises devices for lifting 30, shown in FIG. 8, each comprising a clip 31 of an edge 28 of the plate 25, a support 32 placed on the equipment 10, and a lifter of the clip 31 to an adjustable height, such as a running nutscrew on a vertical threaded rod of the support 32 and which supports the clip 31. It is therefore easy to slide the plate 25 between the skins 26 and 27 then to raise it delicately, without any substantial risk of damaging the fibres of the blade preform 6 or of deforming their weave. FIG. 7 shows that the outline 33 of the plate 25 is separated by a few centimeters from that (40) of the separating area 7, in order to arrange a portion with a gentle slope 34 of the skin 26 raised by the separator 25 and as such prevent damage to the fibre weave of the blade preform 6.

Figure 9:
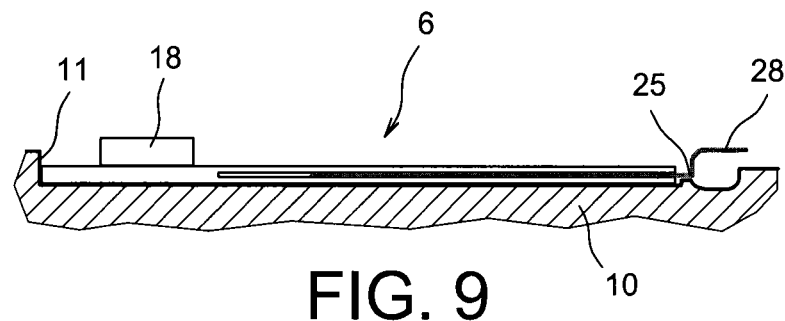
FIGS. 9, 10 and 11 show the use of the separator.
Figure 10:
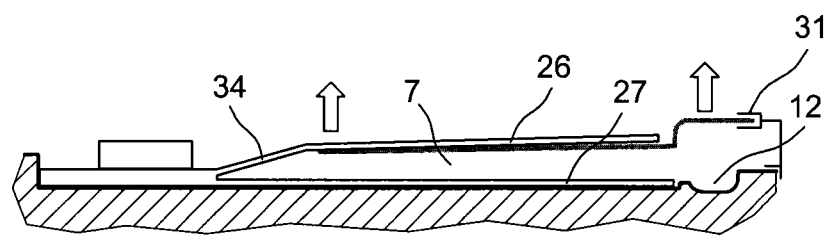

FIGS. 9 and 10 show the device as a side view before and after the separation of the skins 26 and 27 and the opening of the separating area 7.

The longeron 1 is then installed (FIG. 11), the blade core 2 entering into the separating area 7, the blade shank 3 entering into the cavity 12 and able to be retained therein by a flange 35 which itself is integral with the equipment 10. The adjustment of the blade shank 3 in the appendage 12, combined with that of the blade preform 6 in the indentation 11, provides for their manual adjusting in position and therefore the form quality of the blade. The separator and the shoe 18 are then removed, the upper skin 26 returning on the longeron 1, and a step for verification and possible for readjusting the position of this upper skin 26 can be done by redoing the projections of the beam 16 on the trackers 14 and the manual displacements of fibres.

Figure 11:
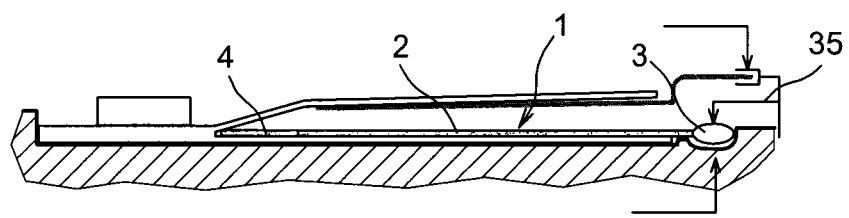

When the insertion of the longeron 1 into the blade preform 6 has as such been completed, the blade preform 6 is dried, either in an oven, the blade shank 3 remaining flanged and the blade preform 6 being covered by a simple protective sheet; or in a vacuum bag again in an oven, and with the blade shank flanged; or finally, as shown in FIG. 11, the drying can be carried out after the installation of an upper shell 36 which closes the indentation 11 of the equipment 10, and this is carried out under a press, the flange 35 having then been removed. Regardless of the mode of drying, the resin of the blade preform 6 is then injected then polymerised, and the blade is machine tooled, with the latter operations being conventional.

The carbon fibres can be identical for the longeron 1 and the blade preform 6, of the IM7 type for example, but the resins are advantageously different in order to allow the longeron 1 to resist the heating and the blade preform 6 to resist impacts, as has been mentioned: the BMI resin can be used for the longeron 1, and the resin PR520 for the blade preform 6. The foam lining 4 can be carried out with Rohacell (registered trademark) 110 XTHT foam.

The invention claimed is:

1. A method for manufacturing a propeller blade, comprising:
    forming a longeron comprising a blade core;
    forming a blade preform comprising a fiber weave, the weave including a separating area wherein it is divided into two superimposed skins, the separating area comprising a location configured to receive the blade core;
    positioning the blade preform into an equipment comprising an indentation of the preform;
    opening the separating area by separating the skins;
    installing the longeron by inserting the blade core into the separating area;
    closing the separating area by bringing the skins closer together;
    injecting resin into the blade preform;
    polymerisation of the resin and machining of the blade preform;
    creating trackers which are reference marks at determined positions on the blade preform, during the forming the blade preform;
    forming the blade preform at a determined position in the indentation after the positioning, by coinciding the trackers with target positions set in the equipment;
    tightening the blade preform in the indentation outside the separating area before the opening of the separating area and until the longeron is installed.

2. A method for manufacturing a propeller blade according to claim 1, wherein the forming the blade preform, the tightening the blade preform, and the opening of the separating area of the blade preform are respectively accomplished by a device for creating the target positions, the device having a position set with respect to the equipment, a device implanted on the equipment, and a device standing on the equipment.

3. A method for manufacturing a propeller blade according to claim 1, further comprising gluing a foam lining around the blade core to form the longeron.

4. A method for manufacturing a propeller blade according to claim 1, wherein the longeron further comprises a blade shank.

5. A method for manufacturing a propeller blade according to claim 4, wherein the equipment indentation comprises an appendage for receiving the blade shank.

6. A method for manufacturing a propeller blade according to claim 1, wherein the longeron is formed by creating a fiber weave, by injecting a second resin into the weave, by polymerising the second resin, and by machine tooling the longeron, the second resin being different from the resin injected in the blade preform.

7. A method for manufacturing a propeller blade according to claim 1, wherein the trackers are tracking fibers of the blade preform, which have a particular appearance.

8. A method for manufacturing a propeller blade according to claim 1, wherein the target positions set in the equipment are created by a laser mobile in front of the blade preform and having a beam directed onto the blade preform.

9. A method for manufacturing a propeller blade according to claim 8, further comprising locating patterns established on the equipment by the laser, to calibrate a position of the laser before it creates the target positions.

10. A method for manufacturing a propeller blade according to claim 8, wherein the positioning of the blade preform is repeated after the installing the longeron and before the injecting the resin.

11. A method for manufacturing a propeller blade according to claim 1, wherein the tightening of the blade preform comprising placing a shoe on the blade preform and clamping the shoe to the blade preform to cause the shoe to penetrate into the indentation, the shoe comprising an inner edge extending at a generally constant distance from an outline of the separating area and extending around the outline outside of the area.

12. A method for manufacturing a propeller blade according to claim 11, wherein the shoe comprises an outer edge, a portion of which follows an outline of the indentation in an adjusted manner, and the inner edge does not overlap portions of a vertical edge and of an inner edge of the blade preform, the indentation comprising an appendage in front of the inner edge of the blade preform for accommodating a blade root which is a part of the longeron.

13. A method for manufacturing a propeller blade according to claim 11, wherein the clamping of the shoe to the blade preform comprises providing supports secured to the equipment and movably pressing the shoe towards a main part of the equipment.

14. A method for manufacturing a propeller blade according to claim 1, wherein the opening of the separating area comprises introducing a separator plate into the separating area without extending to an internal outline of the separating area in the preform, and lifting the plate to enable raising the plate to adjustable heights.

15. A method for manufacturing a propeller blade according to claim 14, wherein the lifting of the plate comprises clipping the plate with a clip; supporting the clip with a support installed on a main part of the equipment, and lifting the clip with a mobile lifter on the support.

* * * * *